United States Patent
No et al.

(10) Patent No.: US 10,345,986 B1
(45) Date of Patent: Jul. 9, 2019

(54) INFORMATION CYCLING IN GRAPHICAL NOTIFICATIONS

(71) Applicant: Google Inc., Mountain View, CA (US)

(72) Inventors: Charles No, Mountain View, CA (US); Joao Paulo Gil de Paiva, Menlo Park, CA (US); Heath Kessler, Mountain View, CA (US)

(73) Assignee: Google LLC, Mountain View, CA (US)

( * ) Notice: Subject to any disclaimer, the term of this patent is extended or adjusted under 35 U.S.C. 154(b) by 241 days.

(21) Appl. No.: 15/185,939

(22) Filed: Jun. 17, 2016

Related U.S. Application Data

(60) Provisional application No. 62/337,668, filed on May 17, 2016.

(51) Int. Cl.
| | | |
|---|---|---|
| *G06F 3/0481* | (2013.01) | |
| *G06F 1/16* | (2006.01) | |
| *G06F 3/0484* | (2013.01) | |
| *G06F 3/0488* | (2013.01) | |
| *G06F 3/01* | (2006.01) | |
| *G06F 3/0485* | (2013.01) | |

(52) U.S. Cl.
CPC ............ *G06F 3/0481* (2013.01); *G06F 1/163* (2013.01); *G06F 3/017* (2013.01); *G06F 3/0485* (2013.01); *G06F 3/04845* (2013.01); *G06F 3/04883* (2013.01)

(58) Field of Classification Search
CPC .............................. G06F 3/0481; G06F 3/0485
See application file for complete search history.

(56) References Cited

U.S. PATENT DOCUMENTS

| | | |
|---|---|---|
| D183,488 S | 9/1958 | Horwitt |
| D322,038 S | 12/1991 | Strasser et al. |
| D485,279 S | 1/2004 | DeCombe |
| D497,617 S | 10/2004 | Decombe et al. |
| 7,213,051 B2 | 5/2007 | Zhu et al. |
| D555,520 S | 11/2007 | Strasser |
| D566,579 S | 4/2008 | Tran |

(Continued)

OTHER PUBLICATIONS

International Search Report and Written Opinion of International Application No. PCT/US2017/029912, dated Jul. 18, 2017, 11 pp.

(Continued)

*Primary Examiner* — Phenuel S Salomon
(74) *Attorney, Agent, or Firm* — Shumaker & Sieffert, P.A.

(57) ABSTRACT

A computing system is described that includes one or more processors and at least one module. The module is operable by the processors to output a graphical user interface, and, responsive to receiving an indication of an event: output, within the graphical user interface, a graphical notification including a first graphical element associated the event, responsive to determining that the computing system did not detect a user input prior to a first predetermined amount of time having elapsed since the first graphical element was output, output, within the graphical notification and in place of the first graphical element, a second graphical element associated with the event, and, responsive to determining that the computing system did not detect the user input prior to a second predetermined amount of time having elapsed since the second graphical element was output, output the graphical user interface without the graphical notification.

19 Claims, 5 Drawing Sheets

(56) References Cited

U.S. PATENT DOCUMENTS

| | | | |
|---|---|---|---|
| D603,421 S | 11/2009 | Ebeling et al. | |
| D627,240 S | 11/2010 | Strasser | |
| D691,629 S | 10/2013 | Matas et al. | |
| 8,994,827 B2 | 3/2015 | Mistry et al. | |
| D735,589 S | 8/2015 | Grinberg | |
| D750,124 S | 2/2016 | Everette et al. | |
| D750,126 S | 2/2016 | Lee | |
| D751,599 S | 3/2016 | Connolly | |
| D752,062 S | 3/2016 | Forsblom | |
| D762,672 S | 8/2016 | Lee et al. | |
| D762,717 S | 8/2016 | Kim et al. | |
| D794,038 S | 8/2017 | Sonoda et al. | |
| D795,917 S | 8/2017 | Escutia et al. | |
| D811,418 S | 2/2018 | Sun et al. | |
| D812,078 S | 3/2018 | Wang et al. | |
| 2003/0112262 A1 | 6/2003 | Adatia et al. | |
| 2004/0257367 A1 | 12/2004 | Smith et al. | |
| 2005/0262451 A1 | 11/2005 | Remignanti et al. | |
| 2006/0026245 A1* | 2/2006 | Cunningham | H04L 51/04 709/206 |
| 2007/0298843 A1* | 12/2007 | Kwon | H04M 1/72572 455/566 |
| 2009/0055494 A1* | 2/2009 | Fukumoto | G06Q 10/107 709/206 |
| 2009/0073132 A1 | 3/2009 | Lee et al. | |
| 2009/0113298 A1 | 4/2009 | Jung et al. | |
| 2011/0072492 A1* | 3/2011 | Mohler | G06F 3/04817 726/3 |
| 2011/0261079 A1 | 10/2011 | Ingrassia, Jr. et al. | |
| 2011/0264663 A1* | 10/2011 | Verkasalo | G06Q 10/06 707/740 |
| 2011/0265041 A1* | 10/2011 | Ganetakos | A63F 13/533 715/834 |
| 2012/0015693 A1* | 1/2012 | Choi | H04M 1/72566 455/566 |
| 2012/0185803 A1* | 7/2012 | Wang | G06F 3/04817 715/847 |
| 2012/0229909 A1 | 9/2012 | Clavin et al. | |
| 2012/0323933 A1* | 12/2012 | He | G06Q 10/107 707/749 |
| 2013/0080890 A1* | 3/2013 | Krishnamurthi | H04W 4/20 715/702 |
| 2013/0127910 A1 | 5/2013 | Tijssen et al. | |
| 2013/0187753 A1* | 7/2013 | Chiriyankandath | G06F 3/0488 340/5.51 |
| 2013/0346347 A1* | 12/2013 | Patterson | G06N 20/00 706/12 |
| 2013/0346408 A1* | 12/2013 | Duarte | G06Q 10/10 707/737 |
| 2014/0019892 A1 | 1/2014 | Mayerhofer | |
| 2014/0240122 A1* | 8/2014 | Roberts | G16H 40/63 340/539.11 |
| 2015/0007049 A1* | 1/2015 | Langlois | H04L 51/24 715/752 |
| 2015/0007066 A1 | 1/2015 | Joo et al. | |
| 2015/0033165 A1 | 1/2015 | Yoo et al. | |
| 2015/0067596 A1 | 3/2015 | Brown et al. | |
| 2015/0248389 A1* | 9/2015 | Kahn | G06F 17/241 715/230 |
| 2015/0286387 A1* | 10/2015 | Gu | G06F 3/017 715/779 |
| 2015/0286391 A1* | 10/2015 | Jacobs | G06F 1/163 715/771 |
| 2016/0062540 A1* | 3/2016 | Yang | G06F 3/0481 345/173 |
| 2016/0062570 A1 | 3/2016 | Dascola et al. | |
| 2016/0085397 A1 | 3/2016 | Jain | |
| 2016/0175695 A1 | 6/2016 | McKee et al. | |
| 2016/0306442 A1 | 10/2016 | Lee et al. | |

OTHER PUBLICATIONS

Response to First Official Notice, and translation thereof, from counterpart Chinese Application No. 201630559127.7, dated Jun. 19, 2017, 4 pp.

Notification for Patent Registration Formalities from counterpart Chinese Application No. 201630559127.7, dated Oct. 10, 2017, 5 pp.

Office Action from U.S. Appl. No. 29/565,017, dated Sep. 20, 2017, 8 pp.

Response to the Office Action dated Sep. 20, 2017, from U.S. Appl. No. 29/565,017, filed Dec. 18, 2017, 17 pp.

Reply to Written Opinion of International Application No. PCT/US2017/029912, filed Jan. 17, 2018, 16 pp.

Hager, "Movado Connect, the latest high-fashion entrant into the world of Android Wear, available $595", Aug. 16, 2017, Android Police [online]. Available from Internet, <URL: https://www.androidpolice.com/2017/08/16/movado-connect-latest-high-fashion-entrant-world-android-wear-available-595/> 7 pp.

Movado, "All Smartwatches", Nov. 13, 2015, © Movado Group [online]. Available from Internet, <URL: https://www.movado.com/us/en/movado_motion/shop-all-smartwatches/> 4 pp.

Phones and Drones, "Movado Connect Vs Tag Heuer Connected Modular 45", Jan. 3, 2018, YouTube, LLC, [online]. Available from Internet, [frames 0:48-0:51] <URL: https://www.youtube.com/watch?v=AwGdj5zWng8/> 1 pp.

International Preliminary Report on Patentability of International Application No. PCT/US2017/029912, dated Jul. 12, 2018, 9 pp.

\* cited by examiner

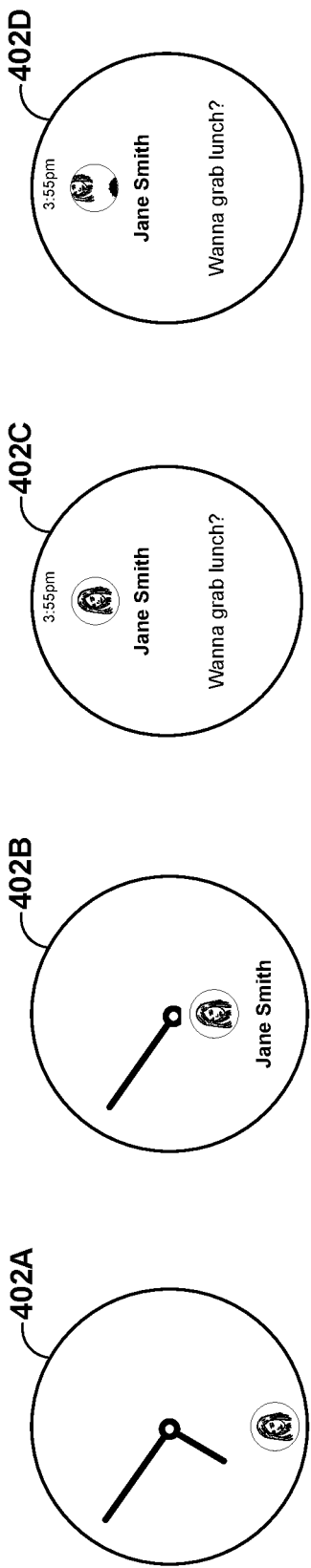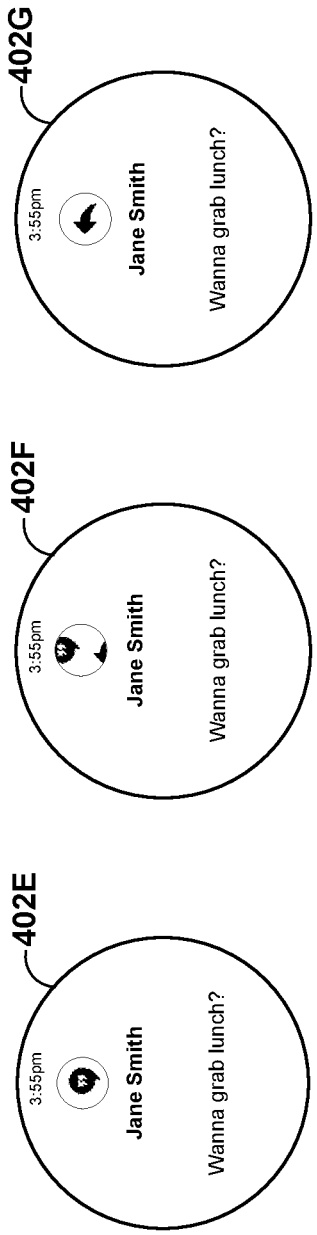

INFORMATION CYCLING IN GRAPHICAL NOTIFICATIONS

RELATED APPLICATION

This application claims the benefit of U.S. Provisional Patent Application No. 62/337,668, filed May 17, 2016, the entire content of which is hereby incorporated by reference.

BACKGROUND

Computing devices allow a user to perform a variety of functions, including various forms of communication and computing. In some examples, a computing device may output, for display, notifications of various events (e.g., an upcoming appointment, an incoming communication, etc.). The amount of information that can be displayed may be based on a size of a display device associated with the computing device or on what visual content is currently being displayed by the display device. As such, outputting such notifications may obscure content already being displayed by the display device.

SUMMARY

In one example, a method includes outputting, by a processor of wearable computing device and for display by a display component of the wearable computing device, a watch graphical user interface. The method further includes, responsive to receiving an indication of an event: outputting, by the processor and for display by the display component, a graphical notification within the watch graphical user interface, the graphical notification including a first graphical element associated the event, wherein the graphical notification is output such that it visually slides in from an edge of the display component and into a region of the watch graphical user interface, responsive to determining, by the processor, that it did not detect a user input prior to a first predetermined amount of time having elapsed since the first graphical element was output, outputting, by the processor and for display by the display component, within the graphical notification and in place of the first graphical element, a second graphical element associated with the event, wherein the first graphical element is output such that it visually scrolls out of the graphical notification and the second graphical element is output such that it visually scrolls into the graphical notification, and, responsive to determining, by the processor, that it did not detect the user input prior to a second predetermined amount of time having elapsed since the second graphical element was output, outputting, by the processor and for display by the display component, the watch graphical user interface without the graphical notification, wherein the graphical notification is output such that it visually slides to the edge of the display component and off of the display component.

In another example, a computing system includes one or more processors, a display component, and at least one module. The at least one module is operable by the one or more processors to output, for display by the display component, a graphical user interface, and, responsive to receiving an indication of an event: output, for display by the display component, a graphical notification within the graphical user interface, the graphical notification including a first graphical element associated the event, wherein the graphical notification is output such that it visually slides in from an edge of the display component and into a region of the graphical user interface, responsive to determining that the computing system did not detect a user input prior to a first predetermined amount of time having elapsed since the first graphical element was output, output, for display by the display component, within the graphical notification and in place of the first graphical element, a second graphical element associated with the event, wherein the first graphical element is output such that it visually scrolls out of the graphical notification and the second graphical element is output such that it visually scrolls into the graphical notification, and, responsive to determining that the computing system did not detect the user input prior to a second predetermined amount of time having elapsed since the second graphical element was output, output, the graphical user interface without the graphical notification, wherein the graphical notification is output such that it visually slides toward the edge of the display component and then disappears from the display component.

In an additional example, a computer-readable storage medium comprising instructions that, when executed, configure one or more processors of a computing device to output, for display by a display component, a graphical user interface. The instructions, when executed, further configure the one or more processors of the computing device to, responsive to receiving an indication of an event: output, for display by the display component, a graphical notification within the graphical user interface, the graphical notification including a first graphical element associated the event, wherein the graphical notification is output such that it visually slides in from an edge of the display component and into a region of the graphical user interface, responsive to determining that the computing device did not detect a user input prior to a first predetermined amount of time having elapsed since the first graphical element was output, output, for display by the display component, within the graphical notification and in place of the first graphical element, a second graphical element associated with the event, wherein the first graphical element is output such that it visually scrolls out of the graphical notification and the second graphical element is output such that it visually scrolls into the graphical notification, and, responsive to determining that the computing device did not detect the user input prior to a second predetermined amount of time having elapsed since the second graphical element was output, output, for display by the display component, the graphical user interface without the graphical notification, wherein the graphical notification is output such that it visually slides toward the edge of the display component and then disappears from the display component.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIGS. 4A-4G are conceptual diagrams illustrating example graphical user interfaces that include cycling various event information, in accordance with one or more techniques of the present disclosure.

DETAILED DESCRIPTION

Figure 1:
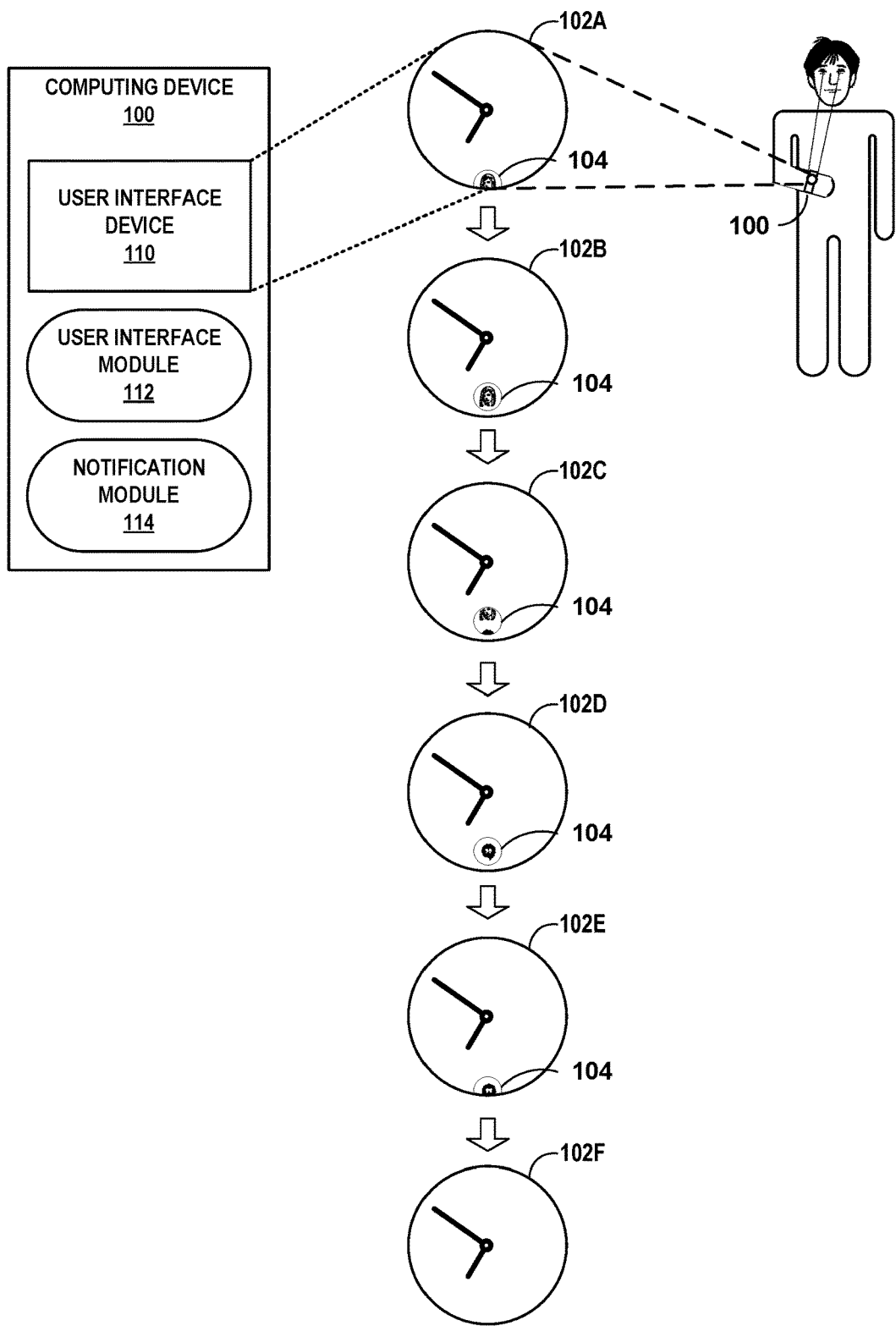
FIG. 1 is a conceptual diagram illustrating an example computing device for cycling event information on a watch face, in accordance with one or more techniques of the present disclosure.

Techniques according to the disclosure may enable a computing device to provide graphical indications of event notifications (referred to simply as "graphical notifications"). For example, in response to determining that the computing device received an incoming communication, such as a text message, the computing device may output an animation of a graphical notification sliding in from an edge of a display. The graphical notification may include a graphical element associated with the text message, such as an image of the person who sent the text message and may be sized such that only a portion of the graphical user interface includes the graphical notification. In some examples, the graphical notification may be sized and positioned based on other information currently included within the graphical user interface so as to minimize the amount of information obscured by the graphical notification. The graphical element within the graphical notification may change over time such that additional information for the event may be presented without requiring additional space on the display. That is, after a period of time, the graphical element within the graphical notification may change to a different graphical element associated with the text message, such as an indication of the messaging application associated with the text message.

In some examples, a user of the computing device may provide input to select the graphical notification. If the user provides the input to select the graphical notification, the computing device may replace the current graphical user interface that includes the graphical notification with a different graphical user interface that includes information associated with an event indicated by the graphical notification. For example, the different graphical user interface may include at least a portion of the text message (reference above) in addition to an image of the sender of the text message. If the user does not provide input to select the graphical notification (e.g., because the user does not desire to view further details about the event), the computing device may output an animation of the graphical notification sliding off the display.

In this manner, techniques of this disclosure may enable a computing device to output event information in a way that may minimize the disruption to the user while also providing additional information about the event. By cycling output of visual information associated with the event, the computing device may output additional information about the event without requiring additional screen space, which otherwise might interfere with other information currently being displayed within the graphical user interface. In various instances, this technique may reduce the amount of time a user may need to interact with the computing device and may additionally reduce the number of user inputs required to understand the event associated with the notification—thereby simplifying the user experience. Further, techniques according to this disclosure may also reduce power consumption of the computing device by minimizing the total amount of time that information is output for display by the device, thereby reducing a total amount of power necessary to power the display associated with the computing device.

Throughout the disclosure, examples are described in which a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a block diagram illustrating an example computing device for cycling event information on a watch face, in accordance with one or more techniques of the present disclosure. Computing device 100 may represent a mobile device, such as a smart phone, a tablet computer, a laptop computer, etc., a wearable computing device, such as a computerized watch, computerized eyewear, computerized gloves, or any other type of portable or wearable computing device. Additional examples of computing device 110 include desktop computers, televisions, personal digital assistants (PDA), portable gaming systems, media players, e-book readers, mobile television platforms, automobile navigation and entertainment systems, vehicle (e.g., automobile, aircraft, or other vehicle) cockpit displays, or any other types of wearable and non-wearable, mobile or non-mobile computing devices that may output notifications. In other examples, computing device 100 may be one or more processors, e.g., one or more processors of one or more of the computing devices described above.

As shown in FIG. 1, computing device 100 includes user interface device (UID) 110, user interface (UI) module 112, and notification module 114. Modules 112 and 114 may perform operations described using software, hardware, firmware, or a mixture of hardware, software, and firmware residing in and/or executing at computing device 100. For example, one or more processors of computing device 100 may execute instructions that are stored at a memory or other non-transitory storage medium of computing device 100 to perform the operations of modules 112 and 114. Computing device 100 may execute modules 112 and 114 as virtual machines executing on underlying hardware. As other examples, modules 112 and 114 may execute as one or more services of an operating system or computing platform, or modules 112 and 114 may execute as one or more executable programs at an application layer of a computing platform.

UID 110 of computing device 100 may function as respective input and/or output devices for computing device 110. UID 110 may be implemented using various technologies. For instance, UID 110 may function as an input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. UID 110 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 100.

UID 110 may detect input (e.g., touch and non-touch input) from a user of computing device 100. UID 110 may detect input by detecting one or more gestures from a user (e.g., the user touching, pointing, and/or swiping at or near one or more locations of UID 110 with a finger or a stylus pen). UID 110 may output information to a user in the form of a graphical user interface (e.g., graphical user interfaces 102A-102F), which may be associated with functionality provided by computing device 100. Such user interfaces may be associated with computing platforms, operating systems, applications, and/or services executing at or accessible from computing device 100 (e.g., electronic message applications, chat applications, Internet browser applications, mobile or desktop operating systems, social media applications, electronic games, and other types of applications). For example, UID 110 may present one of graphical user interfaces 102A-102F (collectively, "graphical user interfaces 102") which, as shown in FIG. 1, is a watch graphical user interface and includes various graphical elements, such as watch hands, displayed at various locations of UID 110. Although shown in FIG. 1 as a watch graphical user interface, user interface 102 may be any graphical user interface for any application or operating system.

UI module 112 manages user interactions with UID 110 and other components of computing device 100. In other words, UI module 112 may act as an intermediary between various components of computing device 100 to make determinations based on user input detected by UID 110 and generate output at UID 110, e.g., in response to the user input. UI module 112 may receive instructions from an application, service, platform, or other module of computing device 100 to cause UID 110 to output a graphical user interface (e.g., graphical user interface 102) UI module 112 may manage inputs received by computing device 100 as a user views and interacts with the user interface presented at UID 110 and update the user interface in response to receiving additional instructions from the application, service, platform, or other module of computing device 100 that is processing the user input.

Notification module 114 may manage the output of notifications associated with various events. For example, notification module 114 may determine when to output the notification, what type of notification to output (e.g., visual, audio, haptic, etc.), etc. Rather than outputting, for display, a notification having a fixed portion of information associated with a subject of the notification (e.g., an event), techniques of this disclosure may enable computing device 100 to scroll information conveyed by the notification. In some examples, computing device 100 may extract important information associated with the event and output an initial visual rendering of the important information. If computing device 100 determines that a user of computing device 100 has not provided input to select the visual rendering, computing device 100 may output additional information associated with the notification.

As one example, computing device 100 may receive an indication of an event (e.g., an indication of upcoming travel plans including an upcoming flight) or otherwise determine an occurrence of an event. In general, an event, as used in this disclosure, may include any incoming communication, such as an email, text message, phone call, etc., an upcoming a calendar appointment, an alarm, a travel event, a reservation, a shipment alert, weather event, fitness event, system alert, a reminder, or a traffic alert, a departure time, upcoming travel information, concert information, movie information, or occurrence of any other activity. The indication of the event may include content, such as a sender, recipient, subject, text, images, video, audio, and other information of an incoming communication, travel time information, flight information, ticketing information, location information, etc. In some instances, the event is determined (e.g., by a predictive knowledge service) based on one or more prior messages received by or sent by a user associated with computing device 100 (e.g., based on a flight confirmation email, a dinner invitation text message, an electronic receipt, a voicemail message, etc.).

Computing device 100 may receive the indication of the event from a remote server system (e.g., a cloud service, an email service, a predictive knowledge service, etc.) or the indication may be generated by an application, operating system, or other element of computing device 100 and an element, such as information notification module 114, may receive the indication of the event from the other element of computing device 100. When describing computing device 100 or another computing device as receiving an indication of the event, both examples are contemplated.

In situations in which the systems discussed herein, computing device 100 or element thereof, such as information notification module 114, may collect personal information about the user, or may make use of the user's personal information, the user may be provided with an opportunity to control whether, and to what extent, programs or features collect the user's information (e.g., information about the user's social network, social actions or activities, profession, the user's preferences, or the user's current location), or to control whether and/or how to receive content from the content server that may be more relevant to the user. In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how information is collected about the user and used by a content server.

Notification module 114 may analyze the indication of the event (e.g., an upcoming flight, incoming text message, etc.) and determine a set of information associated with the event to be presented or otherwise output for display by computing device 100. In general, information notification module 114 may identify one or more people, businesses, or other entities associated with the event, identify an activity associated with the event, identify a location associated with the event, identify date and time associated with the event, identify an application associated with the event, etc. For example, notification module 114 may identify departure information for the flight (e.g., a departure date, time, airport, terminal, gate, etc.), an airline associated with the flight, traffic conditions between the current location of the user associated with computing device 100, the departure airport, etc. As another example, when the event is an incoming text message, notification module 114 may identify a sender of the incoming text message and an application associated with the text message.

In general, notification module 114 may provide an indication of the information to display to UI module 112. UI module 112 may cause UID 110 to output a graphical user interface (e.g., graphical user interface 102A) that includes a visual rendering of a first portion of the information associated with the event. In some examples, the visual rendering may include an image or other visual depiction of a person, group, or other entity associated with the event and an image or other visual depiction of a subject of the event. In some examples, the visual rendering may include an amount of time until the user needs to depart for the event, an amount of time until the event starts, an estimated travel time to reach a location associated with the event, a current outdoor temperature, etc. Notification module 114 may cause UID 110 to transition from a lower power state (e.g., a "sleep" state where UID 110 may have a dimmed display screen or otherwise be in a reduced power state that consume less power than a higher power state) to a higher power state (e.g., where UID 110 has a full brightness screen as determined by one or more device settings) in response to receiving the indication of the event.

In the example shown in FIG. 1, UID 110 outputs a watch graphical user interface 102 that includes watch hands indicating a current time. Responsive to receiving an indication of an event (e.g., an incoming communication), notification module 114 may output, for display by the UID 110, a graphical notification within the watch graphical user interface (e.g., graphical notification 104). Graphical notification 104 is one example of a graphical notification associated with the event and may include a first graphical element associated the event. For example, graphical notification 104 may include an image of a sender of the incoming communication.

As shown in graphical user interface 102A of FIG. 1, graphical notification 104 visually slides in from the bottom edge of UID 110 and into a region of the watch graphical user interface. While shown as sliding in from a bottom edge of UID 110, the techniques of this disclosure are not so limited. Graphical notification 104 may slide in from any edge of UID 110, including a side of UID 110 or top of UID 110. In some examples, in addition to outputting graphical notification 104, notification module 114 may also cause computing device 100 to output another notification, e.g., an audio or haptic notification.

After graphical notification 104 visually slides into the configured location of the graphical user interface, as shown in graphical user interface 102B, notification module 114 may maintain include the same graphical element associated with the event within graphical notification 104 for a first configurable amount of time. By sliding in graphical notification 104 and maintaining the same visual appearance of graphical notification 104, notification module 114 may provide an opportunity for a user of computing device 100 to see graphical notification 104, including the initial graphical element included within graphical notification 104 (e.g., an image of a sender of the incoming communication associated with the notification).

If computing device 100 does not detect a user input selecting graphical notification 104 and after the configured amount of time has elapsed since the first graphical element was output, notification module 114 may output, for display by UID 110, a second graphical element associated with the event within graphical notification 104 and in place of the first graphical element. In various examples, notification module 114 may cause the first graphical element to visually scroll out of graphical notification 104 and cause the second graphical element to visually scroll into graphical notification 104. In the example of FIG. 1, graphical user interface 102C illustrates one example of the first graphical element scrolling out of graphical notification 104 and the second graphical element scrolling into graphical notification 104. This visual scrolling of the information associated with the event is referred to herein as "cycling" the information associated with the event. The second graphical element may be additional information associated with the event, such as an application associated with the event, a location associated with the event, a business associated with the event, etc. As shown in graphical user interface 102D, the second graphical element is an application associated with the incoming communication.

Notification module 114 may maintain the same graphical element associated with the event within graphical notification 104 for a second configurable amount of time. The second configurable amount of time may be the same, greater than, or less than the first configurable amount of time. If computing device 100 does not detect a user input selecting graphical notification 104 prior to the second configurable amount of time having elapsed since the second graphical element was output, notification module 114 may output the watch graphical user interface without graphical notification 104, thereby hiding the notification associated with the event. In some examples, notification module 114 may cause graphical notification 104 to visually slide to the edge of UID 110 and off of UID 110. Graphical user interface 102E illustrates one example of graphical notification 104 visually sliding to the edge of UID 110. Graphical user interface 102F is one example of a watch graphical user interface after graphical notification 104 is no longer being displayed.

If computing device 100 detects user input prior to graphical notification 104 ceasing to be displayed by UID 110, notification module 114 may output a different graphical user interface in place of watch graphical user interface 102. That is, in response to detecting user input selection graphical notification 104, notification module 114 may output a notification user interface that includes additional information about the event associated with the notification. For example, if a user taps on graphical notification 104, computing device 100 detects the tap input and determines that it is a user input selecting graphical notification 104. Responsive to receiving the user input, notification module 114 may replace graphical user interface 102 with a different graphical user interface that includes additional information about the incoming communication, such as a subject of the incoming communication, a portion of the content of the incoming communication, a date and/or time the incoming communication was sent, etc.

In this manner, techniques of this disclosure may enable a computing device to provide additional information for an event without requiring additional screen real-estate. That is, by outputting a notification for an event (e.g., a graphical notification) and cycling information for event within the graphical notification, the computing device may provide additional information about the event while reducing the amount of other content already displayed by computing device 100 that is obscured by the notification. By visually cycling through information associated with the event, techniques of this disclosure may enable a user to view information associated with the event while providing a mechanism for the user to be able to view additional information for the event by simply continuing to pay attention to the computing device.

Figure 2:
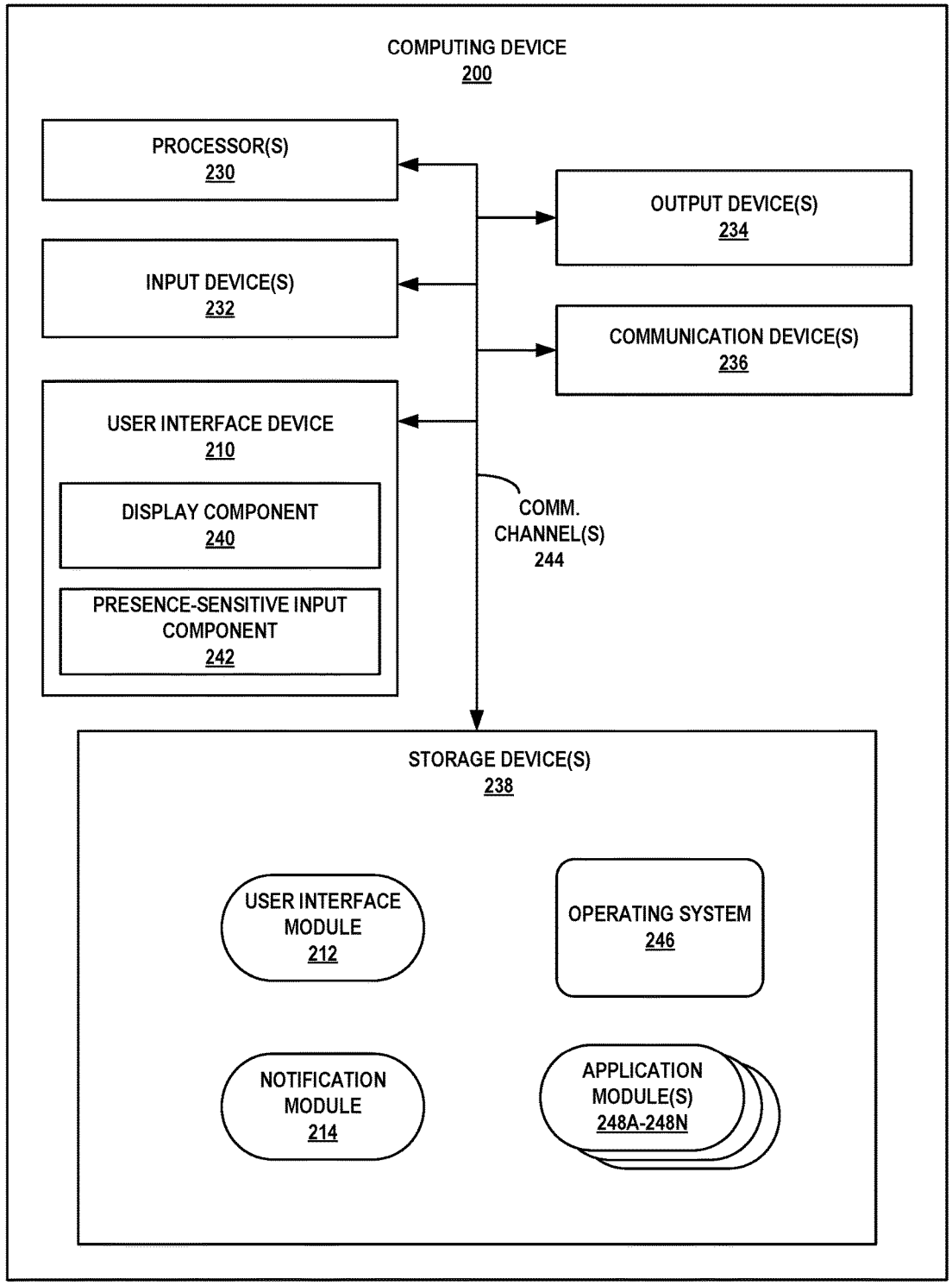
FIG. 2 is a block diagram illustrating an example computing device that cycles event information, in accordance with one or more techniques of the present disclosure.

FIG. 2 is a block diagram illustrating an example computing device that cycles event information, in accordance with one or more techniques of the present disclosure. Computing device 200 of FIG. 2 is described below as an example of computing device 100 of FIG. 1. FIG. 2 illustrates only one particular example of computing device 200, and many other examples of computing device 200 may be used in other instances and may include a subset of the components included in example computing device 200 or may include additional components not shown in FIG. 2.

As shown in the example of FIG. 2, computing device 200 includes user interface device (UID) 210, one or more processors 230, one or more input components 223, one or more output components 234, one or more communication devices 236, and one or more storage components 238. UID 210 includes display component 240 and presence-sensitive input component 242. Storage components 238 of computing device 200 include UI module 212, notification module 214, operating system 246, and one or more application modules 248A-248N (collectively, "application modules 248"). Communication channels 244 may interconnect each of the components 210, 230, 232, 234, 236, and 238 for inter-component communications (physically, communicatively, and/or operatively). In some examples, communication channels 244 may include a system bus, a network connection, an inter-process communication data structure, or any other method for communicating data.

One or more communication devices 236 of computing device 200 may communicate with external devices via one or more wired and/or wireless networks by transmitting and/or receiving network signals on the one or more networks. Examples of communication devices 236 include a network interface card (e.g. such as an Ethernet card), an optical transceiver, a radio frequency transceiver, a GPS receiver, or any other type of device that can send and/or receive information. Other examples of communication devices 236 may include short wave radios, cellular data radios, wireless network radios, as well as universal serial bus (USB) controllers.

One or more input devices 232 of computing device 200 may receive input. Examples of input are tactile, audio, and video input. Input devices 232 of computing device 20, in one example, includes a presence-sensitive input device (e.g., a touch sensitive screen, a PSD), mouse, keyboard, voice responsive system, video camera, microphone or any other type of device for detecting input from a human or machine. In some examples, input devices 232 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output devices 234 of computing device 200 may generate output. Examples of output are tactile, audio, and video output. Output devices 234 of computing device 200, in one example, includes a PSD, sound card, video graphics adapter card, speaker, cathode ray tube (CRT) monitor, liquid crystal display (LCD), or any other type of device for generating output to a human or machine.

UID 210 of computing device 200 is similar to UID 110 of computing device 100 of FIG. 1 and includes display component 240 and presence-sensitive input component 242. Display component 240 may be a screen at which information is displayed by UID 210 and presence-sensitive input component 242 may detect an object at and/or near display component 240. As one example range, presence-sensitive input component 242 may detect an object, such as a finger or stylus that is within two inches or less of display component 240. Presence-sensitive input component 242 may determine a location (e.g., an [x, y] coordinate) of display component 240 at which the object was detected. In another example range, presence-sensitive input component 242 may detect an object six inches or less from display component 240 and other ranges are also possible. Presence-sensitive input component 242 may determine the location of display component 240 selected by a user's finger using capacitive, inductive, and/or optical recognition techniques. In some examples, presence-sensitive input component 240 also provides output to a user using tactile, audio, or video stimuli as described with respect to display component 240. In the example of FIG. 2, UID 210 may present a user interface (such as graphical user interface 102 of FIG. 1).

While illustrated as an internal component of computing device 210, UID 210 may also represent and an external component that shares a data path with computing device 200 for transmitting and/or receiving input and output. For instance, in one example, UID 210 represents a built-in component of computing device 200 located within and physically connected to the external packaging of computing device 200 (e.g., a screen on a computerized watch). In another example, UID 210 represents an external component of computing device 200 located outside and physically separated from the packaging or housing of computing device 200 (e.g., a vehicle head unit, a monitor, a projector, etc. that shares a wired and/or wireless data path with computing device 200).

UID 210 of computing device 200 may detect two-dimensional and/or three-dimensional gestures as input from a user of computing device 200. For instance, a sensor of UID 210 may detect a user's movement (e.g., moving a hand, an arm, a pen, a stylus, etc.) within a threshold distance of the sensor of UID 210. UID 210 may determine a two or three dimensional vector representation of the movement and correlate the vector representation to a gesture input (e.g., a hand-wave, a pinch, a clap, a pen stroke, etc.) that has multiple dimensions. In other words, UID 210 can detect a multi-dimension gesture without requiring the user to gesture at or near a screen or surface at which UID 210 outputs information for display. Instead, UID 210 can detect a multi-dimensional gesture performed at or near a sensor which may or may not be located near the screen or surface at which UID 210 outputs information for display.

One or more processors 230 may implement functionality and/or execute instructions associated with computing device 200. Examples of processors 230 include application processors, display controllers, auxiliary processors, one or more sensor hubs, and any other hardware configure to function as a processor, a processing unit, or a processing device. Modules 212, 214, 246, and 248 may be operable by processors 230 to perform various actions, operations, or functions of computing device 200. For example, processors 230 of computing device 200 may retrieve and execute instructions stored by storage components 238 that cause processors 230 to perform the operations modules 212, 214, 246, and 248. The instructions, when executed by processors 230, may cause computing device 200 to store information within storage components 238.

One or more storage components 238 within computing device 200 may store information for processing during operation of computing device 200 (e.g., computing device 200 may store data accessed by modules 212, 214, 246, and 248 during execution at computing device 200). In some examples, storage component 238 is a temporary memory, meaning that a primary purpose of storage component 238 is not long-term storage. Storage components 238 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 238, in some examples, also include one or more computer-readable storage media. Storage components 238 in some examples include one or more non-transitory computer-readable storage mediums. Storage components 238 may be configured to store larger amounts of information than typically stored by volatile memory. Storage components 238 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 238 may store program instructions and/or information (e.g., data) associated with modules 212, 214, 246, and 248. Storage components 238 may include a memory configured to store data or other information associated with modules 212, 214, 246, and 248.

Operating system 246 may control one or more functionalities of computing device 200 and/or components thereof. For example, operating system 246 may interact with any of user interface module 212, gesture module 154, notification module 214, and application modules 248 and may facilitate one or more interactions between the respective modules and processors 230, input devices 232, output devices 234, communication devices 236, and user interface device 210 (including display component 240 and presence-sensitive input component 242). Although not shown in FIG. 2, operating system 246 may interact with, or be otherwise coupled to, any of the modules described above, as well as to any components thereof. In some examples, one or more of the modules described above may be included within (or be otherwise provided by) operating system 246. Additionally, in some instances, computing device 200 also may use communication devices 236 to access and implement the functionalities provided by computing device 200 and its components, as described above, through methods commonly known as "cloud computing."

In general, computing device 200 may include any combination of one or more processors, one or more FPGAs, one or more ASICs, and one or more application specific standard products (ASSPs). Computing device 200 also may include memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors, FPGAs, ASICs, or ASSPs, to perform the notification information cycling techniques described herein.

Thus, computing device 200 may represent hardware, or a combination of hardware and software, to support the described components, modules, or elements, and the techniques should not be strictly limited to any particular embodiment described herein. Computing device 200 also may include one or more additional components not shown in FIG. 2, such as a global positioning system (GPS) receiver, and a radio frequency identification (RFID) reader, among other components, as well as one or more additional processors, input devices, output devices, communication devices (e.g., so-called "network interfaces"), user interface devices, storage devices, power sources, and so forth.

Application modules 248 represent all the various individual applications and services executing at and accessible from computing device 200. A user of computing device 200 may interact with a graphical user interface associated with one or more application modules 248 to cause computing device 200 to perform a function. Numerous examples of application modules 224 may exist and may include a travel application, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 200.

User interface module 212 may include all functionality of user interface module 112 of computing device 100 of FIG. 1 and may perform similar operations as user interface module 112 for managing a user interface (e.g., user interface 102) that computing device 200 provides at user interface device 210 for handling input from a user. For example, UI module 212 of computing device 200 may output a notification of an event within a graphical user interface, where information included within the notification cycles so as to display additional information about the event without obscuring additional information already displayed.

Similarly, notification module 214 may include all functionality of notification module 114 of computing device 100 of FIG. 1 and may perform similar operations as notification module 112 for managing graphical notifications (e.g., within user interface 102) that computing device 200 provides at user interface device 210. Notification module 214 of computing device 200 may manage the output of notifications associated with various events. For example, notification module 114 may determine when to output the notification, what type of notification to output (e.g., visual, audio, haptic, etc.), etc. and determine what information to cycle between within the graphical notification.

In some examples, user interface module 212 may receive an indication of one or more user inputs detected at UID 210 and may output information about the user inputs to keyboard application 222. For example, UID 210 may detect a user input and send data about the user input to user interface module 212. User interface module 212 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, user interface module 212 may determine that the detected user input is associated the notification (e.g., graphical notification 104 of FIG. 1). User interface module 212 may send an indication of the one or more touch events to notification module 214 for further interpretation. Notification module 214 may determine, based on the touch events received from user interface module 212, that the detected user input is a selection of graphical notification 104.

Computing device 200 may receive an indication of an event, such as an incoming communication, a system notification, a calendar reminder, current activity information, etc. In some examples, computing device 200 may receive the indication of the event from an external device (e.g., a server system, a companion device, etc.) via communication devices 236. Prior to outputting, for display, an indication of the event (e.g., a graphical indication output by UID 210, an indication output by one of output devices 234, etc.), notification module 214 may determine information associated with the event, such as a one or more people, businesses, or other entities associated with the event, an application associated with the event, a location associated with the event, etc.

In one example, computing device 200 determines that a current location of computing device 200 corresponds to a terminal of an airport. In this example, computing device 200 triggers output of a notification of an upcoming airline travel reservation (i.e., the event). Responsive to determining that the current location corresponds to the airport, notification module 214 may receive an indication of the event from, for example, one of application modules 248 or a remote system. Notification module 214 may determine that the airline travel reservation is for a flight on ABC airlines and the flight is scheduled to depart within a predetermined threshold amount of time (e.g., within 1 hour, 2 hours, 12 hours, etc.).

Responsive to receiving the indication of the event, notification module 214 may output, for display by display component 240, an animation of a graphical notification (e.g., graphical notification 104 of FIG. 1) sliding in from an edge of display component 240. The graphical notification may include a first graphical element associated with the event, such as a logo of the airline. If computing device 200 does not detect a user input prior to a first duration of time elapsing, notification module 114 may output, for display by display component 240, a second graphical element associated with the event within the graphical notification and in place of the first graphical element. In various examples, the first graphical element visually scrolls out of the graphical notification and the second graphical element visually scrolls into the graphical notification. The second graphical element may be a matrix barcode (e.g., a QR code) associated with the airline ticket (e.g., a boarding pass).

If computing device 200 does not detect a user input prior to a second duration of time elapsing, notification module 214 may output, for display by display component 240, the graphical user interface without the graphical notification. Notification module 214 may animate the removal of the graphical notification from the graphical user interface such that the graphical notification visually slides to the edge of display component 240 and off of display component 240.

If computing device 200 detects a user input prior to notification module 214 removing the graphical notification from the graphical user interface, notification module 214 may output, for display by the display component, a different graphical user interface in place of the graphical user interface. The different graphical user interface may include additional information associated with the event, such as gate information, a time of the flight, an indication of a delay in the departure time, etc. The user input may include one or more of a tap gestures, tap and hold gesture, a swipe gesture, or a lift and rotate motion of an arm of the user (e.g., a "lift-and-look" gesture in examples where computing device 200 is a computerized watch).

Figure 3:
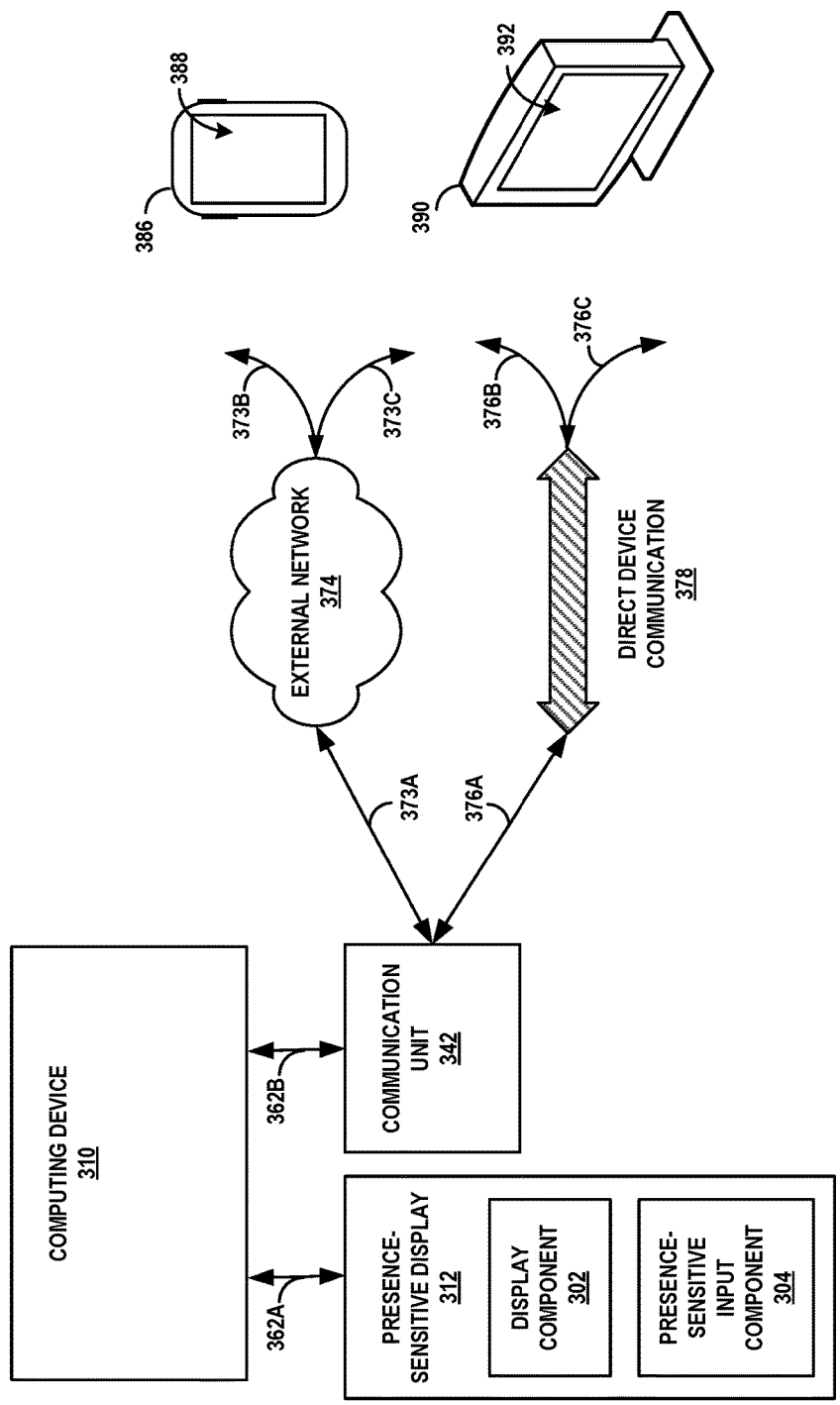
FIG. 3 is a block diagram illustrating an example computing device that outputs information for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, mobile device 386, and visual display component 390. In some examples, PSD 312 may be a user interface device as described in FIGS. 1-2. Although shown for purposes of example in FIGS. 1 and 2 as a stand-alone computing device, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 230 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 100 and 200 in FIGS. 1-2, a computing device may refer to a portable or mobile device such as mobile phones (including smart phones), laptop computers, a wearable device, such as a computerized watch, computerized eyewear, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication device 236 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of user interface devices 110, 210, and/or presence-sensitive display 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device.

In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B or 373C. External network 374 may include network hubs, network switches, network routers, etc., that are operatively inter-coupled thereby providing for the exchange of information between computing device 310 and the remote devices illustrated in FIG. 3. In some examples, network links 373A-373C may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376C. In some examples, communication links 376A-376C may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output, at one or more of presence-sensitive display 312. 388, or 392, a graphical notification of an event in response to receiving an indication of the event. For example, computing device 310 may be part of a mobile computing device communicatively coupled to a head unit of an automobile. In such examples, computing device 310 may output the notification at a display component of the head unit. Computing device 310 may cycle the event information within a predefined portion of a graphical user interface being displayed by the head unit.

FIGS. 4A-4G are conceptual diagrams illustrating example graphical user interfaces that include cycling various event information, in accordance with one or more techniques of the present disclosure. FIGS. 4A-4G are described below within the context of computing device 200 of FIG. 2.

In the example illustrated in FIGS. 4A-4G, computing device 200 receives a text message. As shown in FIG. 4A, GUI 402A is a watch graphical user interface including watch hands and a graphical notification for an event (e.g., the incoming text message) and that includes information for the event (e.g., an image of a sender of the text message). In various examples, notification module 214 caused display component 240 to output the graphical notification, including an animation of the graphical notification sliding in from an edge of display component 240 (represented by the solid line edge of GUI 402A) as described above with respect to graphical notification 104.

Computing device 200 detects a user input selecting the graphical notification (e.g., a tap touch gesture, a tap-and-hold touch gesture, a swipe touch gesture, or a "lift-and-look" gesture). In FIG. 4B, notification module 214, in response to computing device 200 detecting the user input while the graphical notification is displayed by display component 240, begins outputting a different graphical user interface in place of the watch graphical user interface. Graphical user interface 402B illustrates an example screenshot of an animation of the different graphical user interface replacing the watch graphical user interfaces. As shown, notification module 114 outputs an animation of the different graphical user interface sliding in from an edge of display component 240 and visually overlapping the watch graphical user interface. The direction of the slide animation may be based on a direction of the user input selecting the graphical notification. For example, if a user performs a swipe gestures from the top of user interface device 212 towards the bottom of user interface device 212, computing device 200 may determine that the gesture has a downward direction and output the sliding animation as the different graphical user interface sliding down from the top of display component 240, rather than up from the bottom of display component 240, as shown in FIGS. 4A-4G.

Graphical user interface 402C of FIG. 4C illustrates one example of the different graphical user interface after the animation is complete and the different graphical user interface has fully replaced the watch graphical user interface. In FIG. 4C, graphical user interface 402C includes additional information, such as a name of the sender of the text message ("Jane Smith"), at least a portion of the text of the text message ("Wanna grab lunch?"), in addition to the current time and the graphical notification. That is, graphical user interface 402C includes additional information associated with the event as well as the graphical notification (e.g., graphical notification 104). While shown as including the graphical notification, in other examples, the different graphical user interface may not include the graphical notification or other graphical notification included in the watch graphical user interface.

In examples wherein the different graphical user interface includes the graphical notification, notification module 214 may output, for display by display component 240, a second graphical element in the graphical notification (e.g., after a period of time has elapsed). Notification module 214 may cause the second graphical element to visually slide in from one side of the graphical notification while the graphical element previously included within the graphical notification slides out of the graphical notification, as shown in graphical user interface 402D of FIG. 4D and graphical user interface 402E of FIG. 4E. In the example of FIGS. 4A-4G, the second graphical element is associated with the application associated with the incoming text message (e.g., an icon of the texting application).

Similarly, notification module 214 may output, for display by display component 240, a third graphical element in the graphical notification (e.g., after a period of time has elapsed). Notification module 214 may cause the third graphical element to visually slide in from one side of the graphical notification while the graphical element previously included within the graphical notification slides out of the graphical notification, as shown in graphical user interface 402F of FIG. 4F and graphical user interface 402G of FIG. 4G. In some instances, the third graphical element is associated with preforming an action associated with the event. In the example of FIGS. 4A-4G, the third graphical element indicates a reply action the user of computing device 210 may take with respect incoming text message.

Figure 5:
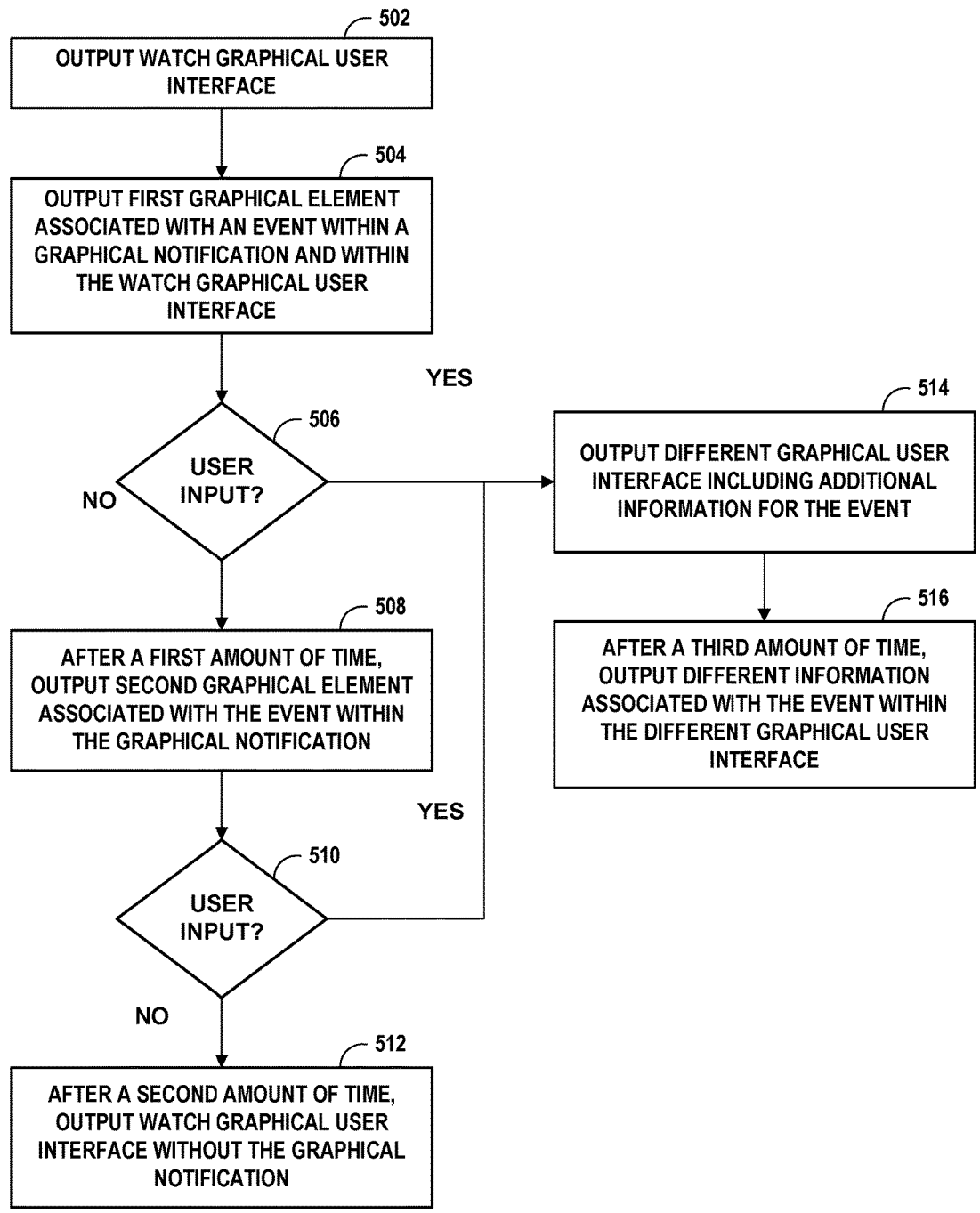
FIG. 5 is a flow diagram illustrating example operations of a computing device to cycle event information, in accordance with one or more techniques of the present disclosure.

FIG. 5 is a flow diagram illustrating example operations of a computing device to cycle event information, in accordance with one or more techniques of the present disclosure. The techniques of FIG. 5 may be performed by one or more processors of a computing device, such as computing devices 100, 200, and 310 illustrated in FIGS. 1-3. For purposes of illustration, the techniques of FIG. 5 are described within the context of computing device 200 of FIG. 2, although computing devices having different configurations may perform the techniques of FIG. 5.

Computing device 200 outputs, for display, a watch graphical user interface (502). The watch graphical user interface may include an indication of a current time (e.g., a digital clock, an analog clock, etc.), an indication of a current date, an indication of an alarm, etc. While described as a watch graphical user interface, in other examples, the graphical user interface may be any graphical user interface output by a computing device. For example, the graphical user interface, in some examples, is an automobile information, navigation, or entertainment system.

Responsive to detecting an event or receiving an indication of an event, computing device 200 may output an animation of a graphical element visually sliding into the graphical user interface from an edge of the graphical user interface such that, upon completion of the sliding animation, the graphical notification of the event is included within the watch graphical user interface (504). The event may be one or more of an incoming communication, a calendar appointment, an alarm, a travel event, a reservation, a shipment alert, weather event, fitness event, system alert, a reminder, or a traffic alert, a departure time, or upcoming travel information. The graphical notification may include a first graphical element associated the event, such as, in examples where the event is an incoming communication, a sender of an incoming communication.

Computing device 200 monitors for user input (506). If computing device 200 does not detect a user input selecting the graphical notification ("NO" branch of 506), computing device 200, after a first period of time has elapsed, outputs a second graphical element within the graphical notification and in place of the first graphical element (508). In various examples, the first graphical element visually scrolls out of the graphical notification and the second graphical element visually scrolls into the graphical notification. In examples where the event is an incoming communication, the second graphical element is an indication of an application associated with the incoming communication, such as an email application, a text message application, a phone application, etc.

After outputting the second graphical element, computing device 200 continues to monitor for user input (510). If computing device 200 does not detect a user input selecting the graphical notification ("NO" branch of 510), computing device 200, after a second period of time has elapsed, may output an animation of the graphical notification visually sliding out of the watch graphical user interface until the watch graphical user interface no longer includes the graphical notification associated with the event (512). While described as only changing between a first graphical element and a second graphical element prior to the graphical notification ceasing to be included within the graphical user interface, in other examples, any number of different graphical element associated with the event may be cycled through and/or computing device 200 may repeat the cycle of graphical elements (e.g., such that the first graphical element follows the second graphical element).

If computing device 200 detects a user input selecting the graphical notification while the graphical notification is included within the graphical user interface ("YES" branch of 506 or "YES" branch of 510), computing device 200 outputs an animation of a different graphical user interface visually siding over the watch graphical user interface such that, upon completion of the animation, the different graphical user interface fully obscures or otherwise covers the watch graphical user interface (514). The user input may be one or more of a tap gestures, tap and hold gesture, a swipe gesture, or a lift and rotate motion of an arm of the user (e.g., in instances where computing device 200 is a computerize watch). In some examples, the user input is a swipe gesture in a direction and the different graphical user interface slides over the watch graphical user interface in the direction of the swipe gesture. The different graphical user interface may include additional information about the event, such as a name of a sender of an incoming communication, a name of a song currently being output, a gate number of a flight, a location at which a picture was taken, etc. and may include the graphical notification including the particular graphical element that was included at the time computing device 200 detected the user input.

In some examples, after the different graphical user interface has been output for a third amount of time, computing device 200 outputs an animation of a third graphical element visually sliding into the graphical notification while the particular graphical element that was included at the time computing device 200 detected the user input visually slides out of the graphical notification (516). The third graphical element may include an indication of an action a user of computing device 200 may take with respect to the event should the user select the graphical notification included within the different graphical user interface. For example, the third graphical element may indicate that the user may reply to the incoming communication, snooze an alarm, skip to a next song, etc.

Example 1

A method comprising: outputting, by a processor of a wearable computing device and for display by a display component of the wearable computing device, a watch graphical user interface; and, responsive to receiving an indication of an event: outputting, by the processor and for display by the display component, a graphical notification within the watch graphical user interface, the graphical notification including a first graphical element associated the event, wherein the graphical notification is output such that it visually slides in from an edge of the display component and into a region of the watch graphical user interface; responsive to determining, by the processor, that it did not detect a user input prior to a first predetermined amount of time having elapsed since the first graphical element was output, outputting, by the processor and for display by the display component, within the graphical notification and in place of the first graphical element, a second graphical element associated with the event, wherein the first graphical element is output such that it visually scrolls out of the graphical notification and the second graphical element is output such that it visually scrolls into the graphical notification; and, responsive to determining, by the processor, that it did not detect the user input prior to a second predetermined amount of time having elapsed since the second graphical element was output, outputting, by the processor and for display by the display component, the watch graphical user interface without the graphical notification, wherein the graphical notification is output such that it visually slides toward the edge of the display component and then disappear from the display component.

Example 2

The method of example 1, further comprising: responsive to determining that the processor detected the user input prior to the first predetermined amount of time having elapsed since the first graphical element was output or prior to the second predetermined amount of time having elapsed since the second graphical element was output: outputting, by the processor and for display by the display component, a different graphical user interface in place of the watch graphical user interface, the different graphical user interface including additional information associated with the event.

Example 3

The method of example 2, wherein the different graphical user interface includes the graphical notification.

Example 4

The method of example 3, further comprising: outputting, by the processor and for display by the display component, a third graphical element in the graphical notification, wherein the first, second, and third graphical elements are distinct graphical elements, and wherein the third graphical element is associated with preforming an action associated with the event.

Example 5

The method of any of examples 2-4, wherein outputting the different graphical user interface comprises outputting an animation of the different graphical user interface sliding over the watch graphical user interface from one edge of the display component.

Example 6

The method of example 5, wherein the user input is a swipe gesture having a direction, and wherein the different graphical user interface slides over the watch user interface in the direction of the swipe gesture.

Example 7

The method of any of examples 1-5, wherein the user input includes one or more of a tap gesture, a tap-and-hold gesture, a swipe gesture, or a lift and rotate motion of an arm of the user.

Example 8

The method of any of examples 1-7, wherein: the event is an incoming communication; the first graphical element is an indication of a sender of the incoming communication; and the second graphical element is an indication of an application associated with the incoming communication.

Example 9

The method of any of examples 1-7, wherein the event is one or more of an incoming communication, a calendar appointment, an alarm, a travel event, a reservation, a shipment alert, weather event, fitness event, system alert, a reminder, or a traffic alert, a departure time, or upcoming travel information.

Example 10

A computing device comprising: one or more processors; a display component; and at least one module operable by the one or more processors to: output, for display by the display component, a graphical user interface; and, responsive to receiving an indication of an event: output, for display by the display component, a graphical notification within the graphical user interface, the graphical notification including a first graphical element associated the event, wherein the graphical notification is output such that it visually slides in from an edge of the display component and into a region of the graphical user interface; responsive to determining that the computing system did not detect a user input prior to a first predetermined amount of time having elapsed since the first graphical element was output, output, for display by the display component, within the graphical notification and in place of the first graphical element, a second graphical element associated with the event, wherein the first graphical element is output such that it visually scrolls out of the graphical notification and the second graphical element is output such that it visually scrolls into the graphical notification; and, responsive to determining that the computing system did not detect the user input prior to a second predetermined amount of time having elapsed since the second graphical element was output, output, for display by the display component, the graphical user interface without the graphical notification, wherein the graphical notification is output such that it visually slides to the edge of the display component and off of the display component.

Example 11

The computing system of example 10, wherein the at least one module is further executable by the one or more processors to: responsive to determining that the computing system detected the user input prior to the first predetermined amount of time having elapsed since the first graphical element was output or prior to the second predetermined amount of time having elapsed since the second graphical element was output, output, for display by the display component, a different graphical user interface in place of the graphical user interface, the different graphical user interface including additional information associated with the event.

Example 12

The computing system of example 11, wherein the different graphical user interface includes the graphical notification.

Example 13

The computing system of example 12, wherein the at least one module is further executable by the one or more processors to: output, for display by the display component, a third graphical element in the graphical notification, wherein the first, second, and third graphical elements are distinct graphical elements, and wherein the third graphical element is associated with preforming an action associated with the event.

Example 14

The computing system of any of examples 11-13, wherein the at least one module is further executable by the one or more processors to output an animation of the different graphical user interface sliding over the graphical user interface from one edge of the display component.

Example 15

The computing system of example 14, wherein the user input is a swipe gesture having a direction, and wherein the different graphical user interface slides over the user interface in the direction of the swipe gesture.

Example 16

A computer-readable storage medium comprising instructions that, when executed, configure one or more processors of a computing device to: output, for display by a display component, a graphical user interface; and, responsive to receiving an indication of an event: output, for display by the display component, a graphical notification within the graphical user interface, the graphical notification including a first graphical element associated the event, wherein the graphical notification is output such that it visually slides in from an edge of the display component and into a region of the graphical user interface; responsive to determining that the computing device did not detect a user input prior to a first predetermined amount of time having elapsed since the first graphical element was output, output, for display by the display component, within the graphical notification and in place of the first graphical element, a second graphical element associated with the event, wherein the first graphical element is output such that it visually scrolls out of the graphical notification and the second graphical element is output such that it visually scrolls into the graphical notification; and, responsive to determining that the computing device did not detect the user input prior to a second predetermined amount of time having elapsed since the second graphical element was output, output, for display by the display component, the graphical user interface without the graphical notification, wherein the graphical notification is output such that it visually slides toward the edge of the display component and then disappears from the display component.

Example 17

The computer-readable storage medium of example 16, wherein the instructions further configure the one or more processors to: responsive to determining that the wearable computing device detected the user input prior to the first predetermined amount of time having elapsed since the first graphical element was output or prior to the second predetermined amount of time having elapsed since the second graphical element was output, output, for display by the display component, a different graphical user interface in place of the graphical user interface, the different graphical user interface including additional information associated with the event.

Example 18

The computer-readable storage medium of example 17, wherein: the different graphical user interface includes the graphical notification; and the instructions further configure the one or more processors to output, for display by the display component, a third graphical element in the graphical notification, wherein the first, second, and third graphical elements are distinct graphical elements, and wherein the third graphical element is associated with preforming an action associated with the event.

Example 19

The computer-readable storage medium of any of examples 17-18, wherein the instructions further configure the one or more processors to output an animation of the different graphical user interface sliding over the graphical user interface from one edge of the display component.

Example 20

The computer-readable storage medium of example 19, wherein the user input is a swipe gesture having a direction, and wherein the different graphical Example 21

A computing device comprising means for performing the method recited by any of examples 1-9.

Example 22

A computer-readable storage medium comprising instructions that, when executed, cause one or more processors of a computing device to perform the method recited by any of examples 1-9.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

outputting, by a processor of a wearable computing device and for display by a display component of the wearable computing device, a watch graphical user interface including a current time; and responsive to receiving an indication of an event:

outputting, by the processor and for display by the display component, a graphical notification within the watch graphical user interface, the graphical notification including a first graphical element associated with the event, wherein the graphical notification is output such that it visually slides in from an edge of the display component and into a region of the watch graphical user interface, and wherein the watch graphical user interface continues to include the current time;

determining, by the processor, whether the wearable computing device detected a user input prior to a first predetermined amount of timing having elapsed since the first graphical element was output;

responsive to determining, by the processor, that the wearable computing device did not detect the user input prior to the first predetermined amount of time having elapsed since the first graphical element was output:

outputting, by the processor and for display by the display component, within the graphical notification included in the watch graphical user interface and in place of the first graphical element, a second graphical element associated with the event, wherein the first graphical element is output such that it visually scrolls out of the graphical notification and the second graphical element is output such that it visually scrolls into the graphical notification; and responsive to determining, by the processor, that the wearable computing device did not detect the user input prior to a second predetermined amount of time having elapsed since the second graphical element was output, outputting, by the processor and for display by the display component, the watch graphical user interface without the graphical notification, wherein the graphical notification is output such that it visually slides toward the edge of the display component and then disappears from the display component; and responsive to determining, by the processor, that the wearable computing device detected the user input prior to the first predetermined amount of time having elapsed since the first graphical element was output or prior to the second predetermined amount of time having elapsed since the second graphical element was output, outputting, by the processor and for display by the display component, a different graphical user interface in place of the watch graphical user interface, the different graphical user interface including additional information associated with the event.

2. The method of claim 1, wherein the different graphical user interface includes the graphical notification.

3. The method of claim 2, further comprising:

outputting, by the processor and for display by the display component, a third graphical element in the graphical notification, wherein the first, second, and third graphical elements are distinct graphical elements, and wherein the third graphical element is associated with preforming an action associated with the event.

4. The method of claim 1, wherein outputting the different graphical user interface comprises outputting an animation of the different graphical user interface sliding over the watch graphical user interface from one edge of the display component.

5. The method of claim 4, wherein the user input is a swipe gesture having a direction, and wherein the different graphical user interface slides over the watch user interface in the direction of the swipe gesture.

6. The method of claim 1, wherein the user input includes one or more of a tap gesture, a tap-and-hold gesture, a swipe gesture, or a lift and rotate motion of an arm of the user.

7. The method of claim 1, wherein:

the event is an incoming communication;

the first graphical element is an indication of a sender of the incoming communication; and the second graphical element is an indication of an application associated with the incoming communication.

8. The method of claim 1, wherein the event is one or more of an incoming communication, a calendar appointment, an alarm, a travel event, a reservation, a shipment alert, weather event, fitness event, system alert, a reminder, or a traffic alert, a departure time, or upcoming travel information.

9. A computing system comprising:

one or more processors;

a display component; and a storage device that stores at least one module operable by the one or more processors to:

output, for display by the display component, a graphical user interface including a current time; and responsive to receiving an indication of an event:

output, for display by the display component, a graphical notification within the graphical user interface, the graphical notification including a first graphical element associated with the event, wherein the graphical notification is output such that it visually slides in from an edge of the display component and into a region of the graphical user interface, and wherein the graphical user interface continues to include the current time;

determine whether the computing system detected a user input prior to a first predetermined amount of timing having elapsed since the first graphical element was output;

responsive to determining that the computing system did not the user input prior to the first predetermined amount of time having elapsed since the first graphical element was output:

output, for display by the display component, within the graphical notification included in the watch graphical user interface and in place of the first graphical element, a second graphical element associated with the event, wherein the first graphical element is output such that it visually scrolls out of the graphical notification and the second graphical element visually scrolls into the graphical notification; and responsive to determining that the computing system did not detect the user input prior to a second predetermined amount of time having elapsed since the second graphical element was output, output, for display by the display component, the graphical user interface without the graphical notification, wherein the graphical notification is output such that it visually slides toward the edge of the display component and then disappears from the display component; and responsive to determining that the computing system detected the user input prior to the first predetermined amount of time having elapsed since the first graphical element was output or prior to the second predetermined amount of time having elapsed since the second graphical element was output, output, for display by the display component, a different graphical user interface in place of the graphical user interface, the different graphical user interface including additional information associated with the event.

10. The computing system of claim 9, wherein the different graphical user interface includes the graphical notification.

11. The computing system of claim 10, wherein the at least one module is further executable by the one or more processors to:

output, for display by the display component, a third graphical element in the graphical notification, wherein the first, second, and third graphical elements are distinct graphical elements, and wherein the third graphical element is associated with preforming an action associated with the event.

12. The computing system of claim 9, wherein the at least one module is further executable by the one or more processors to output an animation of the different graphical user interface sliding over the graphical user interface from one edge of the display component.

13. The computing system of claim 12, wherein the user input is a swipe gesture having a direction, and wherein the different graphical user interface slides over the user interface in the direction of the swipe gesture.

14. The computing system of claim 9, wherein:
the event is an incoming communication;
the first graphical element is an indication of a sender of the incoming communication; and
the second graphical element is an indication of an application associated with the incoming communication.

15. A computer-readable storage medium comprising instructions that, when executed, configure one or more processors of a computing device to:

output, for display by a display component, a graphical user interface including a current time; and responsive to receiving an indication of an event:
output, for display by the display component, a graphical notification within the graphical user interface, the graphical notification including a first graphical element associated with the event, wherein the graphical notification is output such that it visually slides in from an edge of the display component and into a region of the graphical user interface, and wherein the graphical user interface continues to include the current time;

determine whether the computing system detected a user input prior to a first predetermined amount of timing having elapsed since the first graphical element was output;

responsive to determining that the computing device did not the user input prior to the first predetermined amount of time having elapsed since the first graphical element was output:
output, for display by the display component, within the graphical notification included in the watch graphical user interface and in place of the first graphical element, a second graphical element associated with the event, wherein the first graphical element is output such that it visually scrolls out of the graphical notification and the second graphical element is output such that it visually scrolls into the graphical notification; and responsive to determining that the computing device did not detect the user input prior to a second predetermined amount of time having elapsed since the second graphical element was output, output, for display by the display component, the graphical user interface without the graphical notification, wherein the graphical notification is output such that it visually slides toward the edge of the display component and then disappears from the display component; and responsive to determining that the computing device detected the user input prior to the first predetermined amount of time having elapsed since the first graphical element was output or prior to the second predetermined amount of time having elapsed since the second graphical element was output, output, for display by the display component, a different graphical user interface in place of the graphical user interface, the different graphical user interface including additional information associated with the event.

16. The computer-readable storage medium of claim 15, wherein:
the different graphical user interface includes the graphical notification; and
the instructions further configure the one or more processors to output, for display by the display component, a third graphical element in the graphical notification, wherein the first, second, and third graphical elements are distinct graphical elements, and wherein the third graphical element is associated with preforming an action associated with the event.

17. The computer-readable storage medium of claim 15, wherein the instructions further configure the one or more processors to output an animation of the different graphical user interface sliding over the graphical user interface from one edge of the display component.

18. The computer-readable storage medium of claim 17, wherein the user input is a swipe gesture having a direction, and wherein the different graphical user interface slides over the user interface in the direction of the swipe gesture.

19. The computer-readable storage medium of claim 15, wherein:
the event is an incoming communication;
the first graphical element is an indication of a sender of the incoming communication; and
the second graphical element is an indication of an application associated with the incoming communication.

* * * * *